United States Patent
Ji

(10) Patent No.: US 11,222,421 B2
(45) Date of Patent: Jan. 11, 2022

(54) MEDICAL IMAGE DISPLAY METHOD AND IMAGING APPARATUS

(71) Applicant: General Electric Company, Schenectady, NY (US)

(72) Inventor: Yongnan Ji, Beijing (CN)

(73) Assignee: General Electric Company, Schenectady, NY (US)

( * ) Notice: Subject to any disclaimer, the term of this patent is extended or adjusted under 35 U.S.C. 154(b) by 94 days.

(21) Appl. No.: 16/197,763

(22) Filed: Nov. 21, 2018

(65) Prior Publication Data
US 2019/0164280 A1 May 30, 2019

(30) Foreign Application Priority Data

Nov. 24, 2017 (CN) .......................... 201711190553.8

(51) Int. Cl.
*G06T 7/00* (2017.01)
*G06T 11/20* (2006.01)
*G06F 16/901* (2019.01)

(52) U.S. Cl.
CPC ........ *G06T 7/0012* (2013.01); *G06F 16/9024* (2019.01); *G06T 11/206* (2013.01); *G06T 2200/24* (2013.01); *G06T 2207/30004* (2013.01)

(58) Field of Classification Search
CPC . G06T 7/0012; G06T 11/206; G06T 2200/24; G06T 2207/30004; G06F 16/9024
See application file for complete search history.

(56) References Cited

U.S. PATENT DOCUMENTS

| 2004/0151358 A1* | 8/2004 | Yanagita ............... G06F 19/321 382/132 |
| 2015/0052471 A1* | 2/2015 | Chen ..................... G06T 7/0012 715/771 |
| 2015/0294445 A1* | 10/2015 | Sakaue .................. A61B 6/469 382/131 |
| 2016/0335742 A1* | 11/2016 | Yim .................... G01R 33/5608 |
| 2018/0047168 A1* | 2/2018 | Chen .................... C12Q 1/6818 |

* cited by examiner

Primary Examiner — Marcus Hammonds

(57) ABSTRACT

The present invention provides a display method for a medical image, comprising: acquiring a medical image of an imaging object by means of scanning; obtaining, from the medical image, a list containing one or more objects of interest, and object information including positions of the objects of interest; acquiring, according to the positions of the objects of interest and at different imaging positions, a plurality of images that cover the objects of interest; and synthesizing the plurality of images that cover the objects of interest into a dynamic graph and dynamically displaying the dynamic graph.

7 Claims, 4 Drawing Sheets

MEDICAL IMAGE DISPLAY METHOD AND IMAGING APPARATUS

FIELD OF THE INVENTION

The present invention relates to the field of medical images, and in particular to a medical image display method and imaging apparatus.

BACKGROUND OF THE INVENTION

In the process of analysis and diagnosis for a medical image, for example, in a detection in which computer tomography (CT) and magnetic resonance (MR) are used, it is generally necessary to detect a plurality of lesion sites. Taking a pulmonary nodule as an example, a doctor usually needs to detect a plurality of images of the nodule in order to discover a lesion and determine the property of the nodule. The image is usually a sectional image of a part or an organ of a human body, and for each lesion, the doctor often needs to view a plurality of images on a display screen of an imaging system to determine the property of a lesion region, such as the size, the shape and the relationship with the surrounding tissues.

FIG. 1 shows a sectional position view commonly used in medical imaging, and direction settings of X, Y and Z axes. A traditional operation interface can display images of the position of the lesion in three different directions (for example, a horizontal plane, a coronal plane and a sagittal plane), as shown in FIG. 2, wherein the central position of the lesion is identified at the cross point. The doctor can determine the shape and the property of the lesion or organ in a three-dimensional space by observing the images in the three different directions.

The doctor can also manually browse a plurality of images including the lesion region on the same axis to determine the benign and malignancy of the pulmonary nodule, and display, in the direction of the Z axis, a plurality of horizontal plane images at different Z coordinate positions through an operation in an interactive manner, such as a mouse, a keyboard (as shown in FIG. 3). In this case, the doctor needs to adjust the positions of the horizontal sectional images in FIG. 2 with a wheeled mouse, and manually select and observe 8 horizontal plane images of which the positions are between 52 mm and 59 mm in the direction of the Z axis so as to observe all of the nodules and then perform diagnosing.

When processing a multiple lesion, such as a pulmonary nodule, the doctor needs to determine a plurality of lesions on a one-by-one basis. In such a case, the doctor needs to repeatedly operate to determine the property of each lesion. This repeated mechanical operation often takes a large amount of time of the doctor in the case where a great number of images need to be read, which causes the fatigue of the doctor, thereby reducing the image-viewing quality.

BRIEF DESCRIPTION OF THE INVENTION

In order to solve the above-mentioned problems, one aspect of the present invention discloses a display method for a medical image, comprising the steps of: acquiring a medical image of an imaging object by means of scanning; obtaining, from the medical image, a list containing one or more objects of interest, and object information about the objects of interest, the object information including positions of the objects of interest; acquiring, according to the position of at least one of the objects of interest and at different imaging positions, a plurality of images that cover the object of interest; and synthesizing the plurality of images that cover the object of interest into a dynamic graph and dynamically displaying the dynamic graph.

Alternatively, in the display method, the object information further comprises dimension information about the objects of interest.

Alternatively, the imaging positions are a plurality of parallel planes perpendicular to the same axis.

Alternatively, in the steps, the number of the objects of interest is plural.

Alternatively, the display method further comprises the step of playing, at a pre-set speed, the dynamic graph for each of the objects of interest on a one-by-one basis.

Alternatively, in the display method, a user can switch the dynamic graphs for the objects of interest by selecting an object of interest from the list.

Alternatively, in the display method, the dynamically displaying can be switched to statically displaying in response to a user action.

Another aspect of the present invention discloses an imaging apparatus for a medical image, comprising: an imaging processing system that generates, from a medical image of an imaging object acquired by means of scanning, a list containing one or more objects of interest, and object information about the objects of interest, the object information including positions of the objects of interest; and synthesizes, a plurality of images that are acquired according to the position of at least one of the objects of interest and at different imaging positions and that cover the object of interest, into a dynamic graph; and a display interface that displays the dynamic graph for the object of interest.

Alternatively, in the imaging apparatus, the object information further comprises dimension information about the objects of interest.

Alternatively, in the imaging apparatus, a user can switch the dynamic graphs for the objects of interest by selecting an object of interest from the list.

BRIEF DESCRIPTION OF THE DRAWINGS

The technical solution of the present invention will be described further in detail below with reference to the accompanying drawings and embodiments.

DETAILED DESCRIPTION OF THE INVENTION

The specific embodiments of the present invention will be described below, and it should be noted that, in the specific description of these embodiments, for a concise description, the specification could not describe all the features of the practical implementations in detail. It should be understood that, in the practical implementation of any embodiment, just as in the course of any one engineering project or design project, in order to achieve the developers' specific goals and in order to meet system-related or business-related restrictions, a variety of specific decisions will be made accordingly, which will change from one embodiment to another embodiment. Furthermore, it should be understood that, although the efforts made in this development process may be complicated and lengthy, but for those skilled in the art related to the content disclosed in the present invention, some changes in the design, manufacture or production on the basis of the technical content disclosed in this disclosure are merely conventional technical means, and it should not be construed as the content of the present disclosure being insufficient.

Unless otherwise defined, technical or scientific terms used in the claims and description should be interpreted in the ordinary sense as understood by those of ordinary skill in the art to which this invention pertains. The terms "first", "second" and the like used in the specification and the claims in the present invention are merely used to distinguish different components, rather than denoting any order, quantity, or importance. The term "a" or "an" or the like denotes the presence of at least one, rather than representing a quantitative restriction. The term "comprising" or "including" or the like means that the element or object before the term "comprising" or "including" encompasses the element or object or equivalent element listed after the term "comprising" or "including", without excluding other elements or objects.

Figure 1:
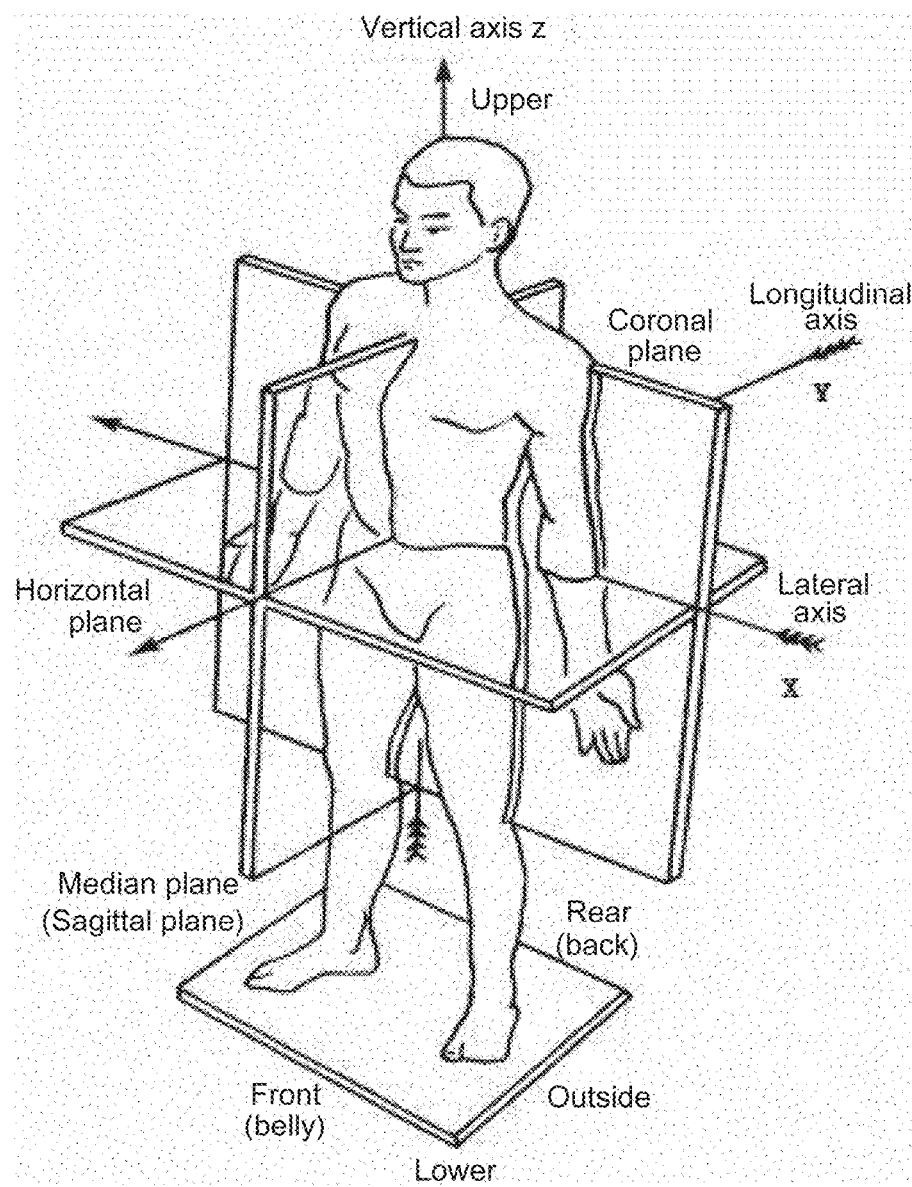
FIG. 1 shows an imaging sectional position commonly used in the current medical imaging, and set directions of X, Y and Z axes in a coordinate system.
Figure 2:
FIG. 2 shows currently common image display modes for a lesion tissue or an organ on an image display interface, wherein a horizontal plane image, a sagittal plane image and a coronal plane image are respectively at the upper left, the upper right and the lower left.
Figure 5:
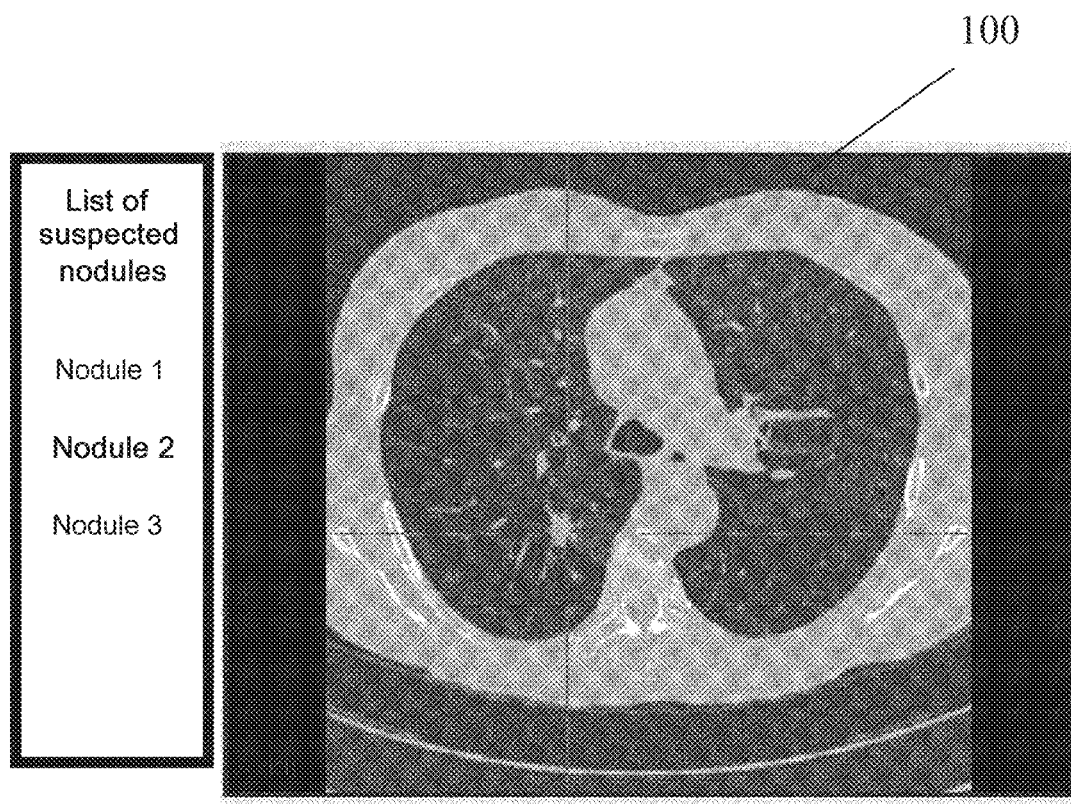
FIG. 5 is a display interface of an imaging apparatus shown according to an embodiment of the present invention.

In the present invention, taking the display of a lesion tissue or an organ as an example, firstly, CT scanning is performed on an imaging object, such as a chest of a patient, and CT images and relevant data are obtained, and then the images and data are analyzed by an imaging processing system in an imaging apparatus by means of an automatic algorithm, such as artificial intelligence, or other approaches, so as to obtain a list of objects of interest as well as object information. The object of interest can for example be a lesion, such as a suspected pulmonary nodule or a tumour. The number of the objects of interest can be singular or plural. The object information about each of the objects of interest comprises the position of the object of interest, for example, the position in the coordinate system shown in FIG. 1, and may further comprise other information such as the size and dimension of the object of interest. As shown in FIG. 5, on the left of the image display interface, a list of suspected nodules is listed, including three suspected nodules which are respectively nodule 1, nodule 2 and nodule 3. The central position of nodule 2 in the coordinate system shown in FIG. 1 is X=23 mm, Y=34 mm, and Z=55 mm, with the radius being approximately 5 mm.

Figure 3:
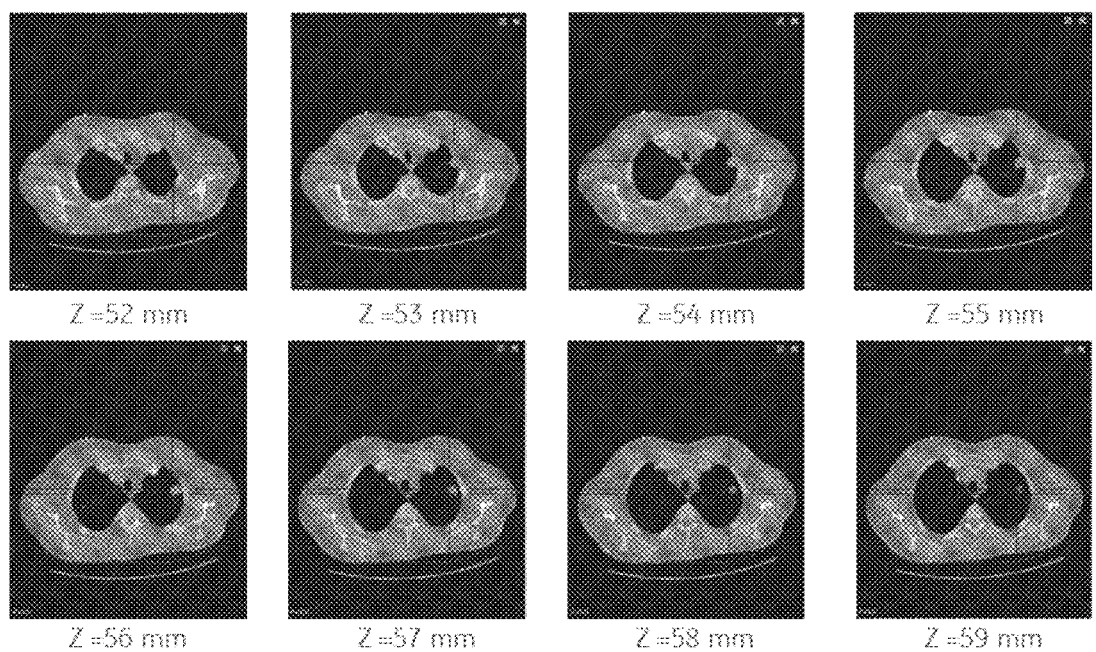
FIG. 3 is a plan view of a nodule of which the diameter is approximately 5 mm at a position between Z=52 mm-59 mm in the coordinate system shown in FIG. 1.

According to the information about each nodule, for each nodule, the number of images and the image acquisition positions sufficient for examining the properties of the nodules are set in advance by a user empirically or automatically computed by the imaging processing system. For example, according to the position and the size of nodule 2, the imaging processing system automatically calculates as follows: at the position of Z=52 mm to 59 mm, 8 horizontal plane (also called axial sectional or slicing) images that cover the range where nodule 2 is located are acquired at an interval of 1 mm, wherein the horizontal planes are several planes perpendicular to the Z axis, and the acquired images are as shown in FIG. 3. Then, the imaging processing system synthesizes the 8 horizontal plane images into a dynamic graph or video, and presents same in a dynamic manner on the display interface as shown in FIG. 5. That is, a display interface 100 on the right of FIG. 5 displays a dynamic graph or a short video including the overall nodule 2. Each frame of the dynamic graph or video corresponds to an image in FIG. 3.

Figure 4:
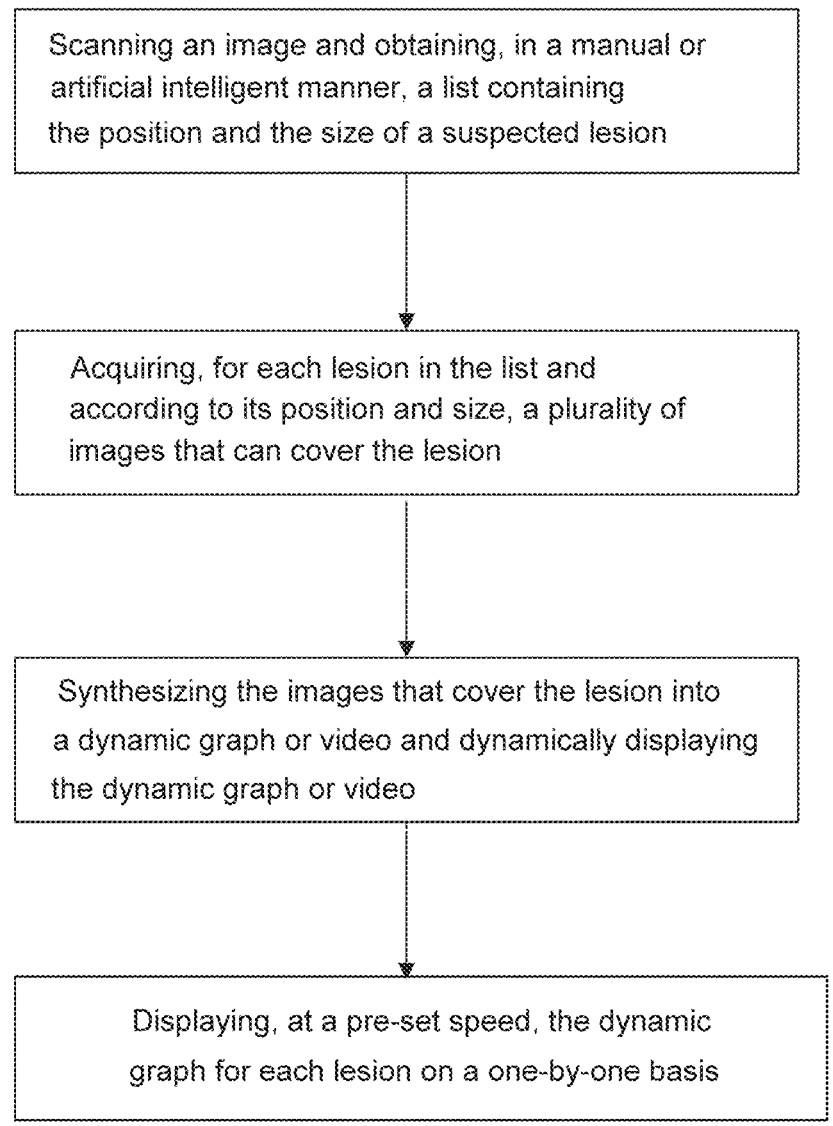
FIG. 4 is a flowchart of a display method for a medical image shown according to an embodiment of the present invention.

In the case where there are a plurality of nodules, the display interface can play, at a pre-set speed, the dynamic graph for each nodule on a one-by-one basis. The user (who can be a doctor) can also select a nodule from the list by means of a keyboard and a mouse, and for the selected nodule, the dynamic graph and the video of the nodule will be displayed on the right of the display interface, wherein the dynamic graph and the video can be configured to be played only once, and at the end of the play, a horizontal plane image located at the central position of the nodule is displayed, or the dynamic graph and the video can also be configured to be played circularly. As an exemplary embodiment of the present invention, the flow chart of the above steps can also be shown with reference to FIG. 4.

Additionally, the user can also easily stop the dynamically displaying of the images. For example, when the mouse of the user enters the right region of the display interface 100, or upon triggering by means of the keyboard, the mouse and the like, the dynamically displaying is stopped, and the user can view single images on a one-by-one basis in a traditional way.

It should be noted that, in the present invention, the images employed for forming the dynamic graph or the video are not merely limited to the horizontal plane images cited in the proceeding embodiment, and the user can also acquire as needed a plurality of images on a coronal plane, a sagittal plane or other planes to realize the desired display effect.

This dynamically displaying solution for images in the present invention improves the display effect of medical images, avoids the tedious procedure in which the doctor has to manually select a plurality of images of a lesion tissue and repeatedly view same multiple times, thereby saving time and aiding the doctor to diagnose more rapidly and effectively.

Some exemplary embodiments have been described above. However, it should be understood that various changes may be made. For example, if the techniques as described are executed in a different order and/or if the components in the system, architecture, apparatus as described are combined in different ways and/or are replaced or supplemented with a further component or an equivalent thereof, an appropriate result can be achieved. Accordingly, other embodiments also fall within the scope of protection of the claims.

I claim:

1. A display method for an image, comprising the steps of:
   acquiring an image of an object;
   obtaining, from the image, a list including a plurality of objects of interest, and object information about the plurality of objects of interest, wherein the object information includes positions of the plurality of objects of interest;
   acquiring, according to the position of at least one of the objects of interest and at different imaging positions, a plurality of images that cover the object of interest; and
   synthesizing the plurality of images that cover the object of interest into a video and dynamically displaying the video;

wherein list includes a first object of interest and a second object of interest and a first object information about the first object of interest and a second object information about the second object of interest, wherein the first object information includes a position of the first object of interest and the second object information includes a position of the second object of interest, and further comprising:
  acquiring, according to the position of the first object of interest, a plurality of images that include the first object of interest;
  acquiring, according to the position of the second object of interest, a plurality of images that include the second object of interest;
  synthesizing the plurality of images that include the first object of interest into a first video;
  synthesizing the plurality of images that include the second object of interest into a second video;
  dynamically displaying the first video; and
  switching to the second video based on a user selectable input of the second object of interest from the list.

2. The display method of claim 1, wherein the object information further comprises dimension information about the objects of interest.

3. The display method of claim 1, wherein the imaging positions are a plurality of parallel planes perpendicular to the same axis.

4. The display method of claim 1, further comprising the step of playing, at a pre-set speed, the video for each of the objects of interest on a one-by-one basis.

5. The display method of claim 1, wherein the dynamically displaying can be switched to statically displaying in response to a user action.

6. An imaging apparatus, comprising:
  an image processing system that generates, from an image of an object, a list containing one or more objects of interest, and object information about the one or more objects of interest, wherein the object information includes positions of the one or more objects of interest; and synthesizes, a plurality of images that are acquired according to the position of at least one of the objects of interest and at different imaging positions and that include the object of interest, into a video; and
  a display interface that displays the video for the object of interest;
  wherein the list includes a first object of interest and a second object of interest and first object information about the first object of interest and second object information about the second object of interest, wherein the first object information includes a position of the first object of interest and the second object information includes a position of the second object of interest, and the image processing system comprises:
  synthesizing a plurality of images that include the first object of interest into a first video;
  synthesizing a plurality of images that include the second object of interest into a second video;
  displaying the first video or the second video; and
  wherein the display of the first video or the second video is selectable based on a user selectable input of selecting an object of interest from the list.

7. The imaging apparatus of claim 6, wherein the object information further comprises dimension information about the objects of interest.

\* \* \* \* \*